United States Patent [19]

Wandel

[11] Patent Number: 4,721,214
[45] Date of Patent: Jan. 26, 1988

[54] INSULATED POT WITH POURING SPOUT

[76] Inventor: Stephan H. A. Wandel, Barlachweg 9, 2800 Bremen 33, Fed. Rep. of Germany

[21] Appl. No.: 52,203

[22] PCT Filed: Sep. 19, 1984

[86] PCT No.: PCT/EP84/00287

§ 371 Date: Jul. 22, 1985

§ 102(e) Date: Jul. 22, 1985

[87] PCT Pub. No.: WO 85/01202

PCT Pub. Date: Mar. 28, 1985

Related U.S. Application Data

[63] Continuation of Ser. No. 740,904, May 22, 1985, abandoned.

[30] Foreign Application Priority Data

Sep. 22, 1983 [DE] Fed. Rep. of Germany ...... 8327217

[51] Int. Cl.⁴ ..................... A47G 23/04; A47J 41/00
[52] U.S. Cl. ..................... 215/13.1; 222/183; 222/572
[58] Field of Search ............... 215/12 R, 12 A, 13 R, 215/13 A; 220/855 P, 421, 425, 444, 461; 222/183, 572, 566

[56] References Cited

U.S. PATENT DOCUMENTS

| | | | |
|---|---|---|---|
| 18,546 | 11/1857 | Hebbard | 222/183 |
| 71,900 | 12/1867 | Niedringhaus et al. | 222/572 |
| 425,400 | 4/1890 | Boles | 222/572 X |
| 877,321 | 1/1908 | Gebler | 222/572 X |
| 2,818,900 | 1/1958 | Sommerfeld | 215/13 R |
| 3,037,652 | 6/1962 | Wallace | 215/13 R |
| 3,094,448 | 6/1963 | Cornelius | 215/13 R X |
| 3,341,045 | 9/1967 | Sandler | 215/13 R |
| 3,355,045 | 11/1967 | Douglas | 215/13 R |
| 4,553,676 | 11/1985 | Zimmermann | 215/12 R X |

FOREIGN PATENT DOCUMENTS

| | | | |
|---|---|---|---|
| 382981 | 10/1931 | Belgium . | |
| 469992 | 1/1929 | Fed. Rep. of Germany . | |
| 1081633 | 5/1960 | Fed. Rep. of Germany | 215/13 R |
| 8302563 | 6/1983 | Fed. Rep. of Germany . | |
| 142396 | 12/1930 | Switzerland . | |
| 14566 | of 1896 | United Kingdom | 215/13 A |
| 450427 | 7/1936 | United Kingdom . | |
| 685562 | 1/1953 | United Kingdom | 215/13 A |
| 778550 | 7/1957 | United Kingdom . | |
| 907329 | 10/1962 | United Kingdom . | |

Primary Examiner—William Price
Assistant Examiner—Sue A. Weaver
Attorney, Agent, or Firm—Burns, Doane, Swecker & Mathis

[57] ABSTRACT

An insulated vessel comprises a container of plastic material and open at the top, the container including an upper part and a lower part, with a glass flask open at the top being accommodated in said container, and the container further including a handle and a pouring spout, the handle and the pouring spout being molded onto or formed integrally with the container, and the vessel further including a cover for its top opening. In order to enable the external form of the vessel to most closely match that of a traditional coffee serving pot, it is provided with the pouring spout integrally attached to the lower half of the container and extends freely to the height of the top opening of the container, and that the glass flask comprises a member in the form of a tubular projection or nipple which extends into the pouring spout.

2 Claims, 2 Drawing Figures

INSULATED POT WITH POURING SPOUT

This application is a continuation of application Ser. No. 740,904, filed May 22, 1985, now abandoned.

BACKGROUND AND SUMMARY OF THE INVENTION

The invention relates to an insulated vessel e.g. a coffee serving pot or teapot comprising a container of plastic material which is open at the top. The container comprising an upper part and a lower part, with a glass flask open at the top being accommodated in said container. The container further includes a handle and a pouring spout molded onto or formed integrally with said container. The vessel further includes a cover for its top opening.

Insulated vessels have proven feasible for storing and maintaining the temperature of hot liquids such as coffee or tea, in the household. In such use, the insulated vessel is employed chiefly as a reservoir. When an insulated vessel of this type is used on a formal coffee table (set with tableware) it appears out of place, because its exterior form does not match that of the coffee service being used.

Thus it is an object of the invention to devise an insulated vessel having an outer shape which as closely as possible matches that of a traditional coffee serving pot.

The invention provides, with respect to an insulated vessel of the type described above, that the pouring spout is integrally attached to the lower half of the container and extends freely to the height of the top opening of the container and that the glass flask comprises a tubular projection nipple which extends into the pouring spout. This enables a coffee serving pot to be formed which has the typical pot-belly shape, where the pouring spout may rise from the low-lying pot-belly region of the pot upward in a straight line or in a slightly curving configuration. Thus, the inventive insulated vessel may match the shape of the classical coffee serving pot to the extent that it is fully integrable into a traditional coffee service, and will no longer be perceived as intrusive or out of place when used on a coffee serving table.

The glass flask may be in the form of a double-walled vacuum insulating container. Additionally or alternatively, a layer of insulation, particularly comprised of polyurethane foam material, may be put in place between the glass flask provided with supports and the container with pouring spout. In this way, the capacity to maintain the temperature of beverages is sustantially improved.

When assembling the insulated vessel, insertion of the glass flask with its supports is facilitated if the upper section of the base of the pouring spout is integrally attached to the upper part or segment of the container and the lower section of the base of the pouring spout is integrally attached to the lower segment of the container. Advantageously, the mouth of the pouring spout may extend beyond the upper end of the tubular projection or nipple, so that the projection or nipple remains protected and there is no irregularity in the shape of the mouth. Further, the mouth may be furnished with a valve or flap which automatically renders the mouth opening passable when pouring is carried out.

BRIEF DESCRIPTION OF THE DRAWINGS

The invention will be described in detail hereinafter, with reference to an exemplary embodiment illustrated in the attached drawings.

DETAILED DESCRIPTION OF THE PREFERRED EMBODIMENTS

Figure 1:
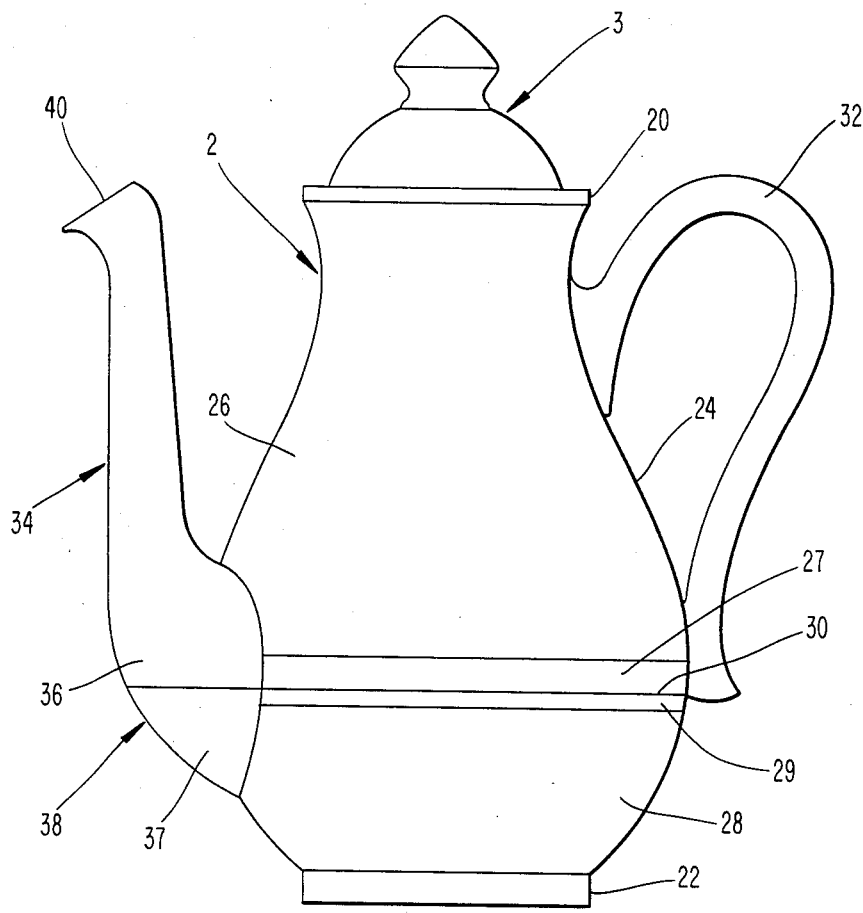
FIG. 1 is a view of an insulated pot.

The insulated pot is comprised of a container 2 of plastic material, and a cover 3 for closing off the top opening of the container 2. The container 2 has an upper collar protuberance 20 and a recessed disc-shaped foot 22, which foot forms the standing surface of the insulated pot. The surface of the container has a curved configuration running from the collar 20 to the foot 22, beginning slightly concave and then undergoing a transition to a pronounced convexity, yielding a container, the 2 shape which is, viewed as a whole, pot-bellied.

The container 2 is comprised of an upper segment 26 and a lower segment 28 which are durably joined at a separating line 30 located at the thickest section of the pot-belly. The region of the upper segment 26 adjoining the separating line 30 has a lap-type recess 27, and the border region of the lower segment 28 which adjoins the separating line 30 has an edge 29, the outer surface of which rests flush against the outer surface of the recess 27.

A curved handle 32 is integrally attached to the upper segment 26. Diametrically opposite the handle 32 on the lower extremity of the upper segment 26, an upper section 36 of a base 38 of a pouring spout 34 is integrally attached to the lower extremity. The spout rises in a gently curving contour which is roughly parallel to the axis of the pot and preserves the bilateral symmetry thereof. The upper end of the spout, comprising a mouth 40, is approximately at the height of the collar protuberance 20. The lower section 37 of the base 38 of the spout 34 has a configuration at the location of its integral joining to the upper edge of the lower segment of the container 28 such that when the insulated pot is assembled the outer surface of the lower section 37 of the spout base joins flush against the outer surface of the upper section 36 of the spout base.

Figure 2:
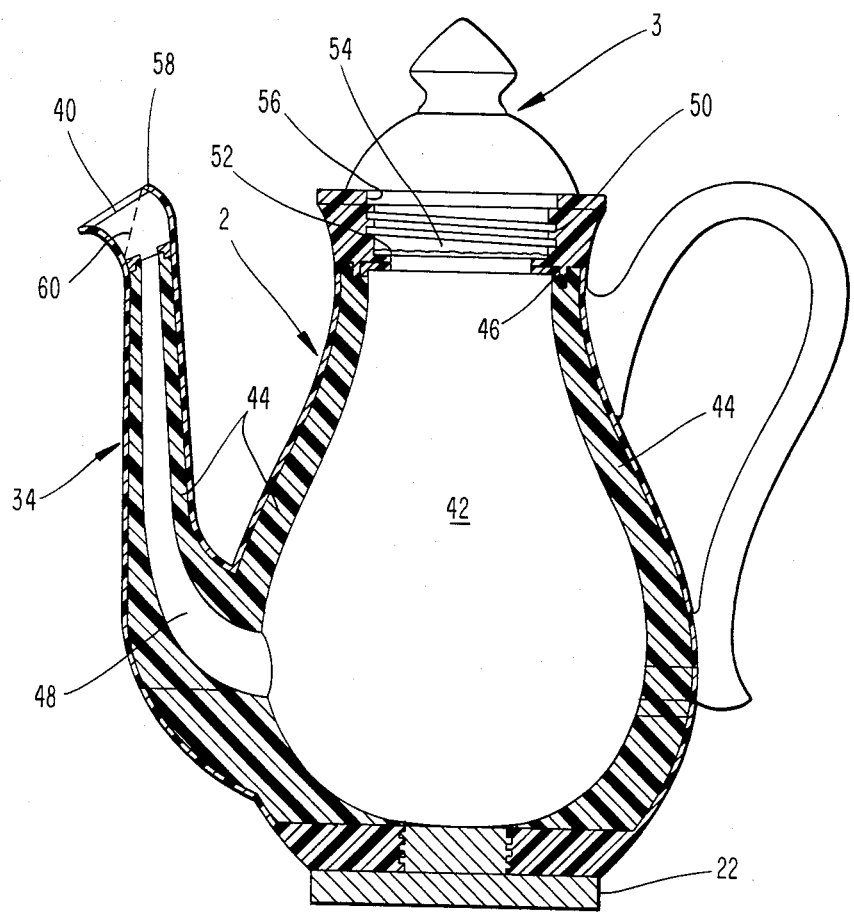
FIG. 2 is a view of the insulated pot of FIG. 1 with half the housing cut away.

As may be seen from FIG. 2, a glass flask 42 is disposed in the interior of the container 2. The outer, drop-shaped contour of the flask follows that of the container 2. An intermediate space is provided between the glass flask 42 and the container 2, which space is filled with insulating material, which material may comprise polyurethane foam 44. The glass flask 42 may comprise a two-walled, thin-walled glass vacuum flask, or as shown may be a single-walled heat-resistant glass. The glass flask 42 may be held in place laterally at its upper end by a collar 46 which may be formed in the inner part of the protruding collar member 20, and may further be held in place laterally by support means formed in the inner part of the lower segment 28. At the widest section of the glass flask 42, a tubular projection or nipple 48 is integrally attached by fusion to the body of the glass flask. This nipple extends in the interior space of the pouring spout 34, to a point slightly below the mouth 40 of the spout 34. The nipple is held in place laterally by a plurality of projections (not shown) in the interior of the spout 34. The interior space of the tubular, curved nipple 48 communicates with the interior space of the glass flask 42, so that the liquid (e.g. coffee) stored in the flask 42 can be poured out through the nipple 48.

The base member 22 of the container is screwed into a central opening in the lower segment 28, which opening is interiorly threaded, whereby member 22 acts as a tensioning screw for the flask 42, pressing the flask 42 against the sealing material on the inner collar 46 of the collar protuberance 20. Sufficient space is available between the nipple 48 and the interior surface of the spout 34 so that insulating material in the form of polyurethane foam may be packed therein, to insulate the column of liquid disposed in said nipple 48.

The collar protuberance 20, which extends upward above the top opening of the glass flask 42 and thereby extends some distance from its own inner collar 46, has a central opening which is provided with an interior thread 50, into which the underside 54 of the dome-shaped cover 3 can be screwed. The underside is convex and is provided with sealing means 52. Thereby when the coffee is being poured out of the insulated pot no liquid can leave through the top opening 56 of the container 2.

In another embodiment (not shown) of the vessel, a flap valve is swingably mounted on the free end 58 of the mouth 40, said mounting being on the side of the mouth nearest the collar protuberance 20. This flap valve closes off the pouring spout 34 when the insulated pot is standing, but when the pot is tipped to pour out the liquid the valve opens up, freeing the opening in the pouring spout 34. Advantageously, with the flap valve feature, the mouth 40 of the spout is cut off at a steep angle 60.

The exterior surfaces of the upper segment 26 and lower segment 28 may be decorated appropriately. Thus, the inventive insulated vessel is adaptable, both in its shape and in its decorative features, to traditional coffee services.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An insulated vessel comprising a container of plastic material having an opening at a top portion, and a glass flask received and held within said container, said container portion formed by an upper portion provided with a handle and a lower portion, the upper and the lower portion joined at a separating line, the upper portion provided with a recess adjacent the separating line, the lower portion provided with an edge region adjacent the separating line, the edge region and the recess being in flush engagement, a pouring spout integrally formed with the container and having a pouring opening extending freely up to a height of the top opening, the separating line extending through a base of the pouring spout such that an upper section of the base is integral to the upper portion and a lower section of the base is integral to the lower portion, the glass flask being provided with a tubular extension projecting into the pouring spout to a point slightly below the pouring opening, an intermediate space defined between the glass flask provided with the tubular extension and said container provided with the pouring spout, said space being filled with insulating material of polyurethane foam; and, tensioning means provided in said container for directly acting on said flask and holding said flask in a substantially fixed position.

2. The insulated vessel according to claim 1 wherein a shutoff flap valve is swingably mounted on said pouring opening.

* * * * *